United States Patent [19]

Retter

[11] Patent Number: 4,913,573
[45] Date of Patent: Apr. 3, 1990

[54] ALPHA-NUMERIC KEYBOARD

[76] Inventor: Dale J. Retter, 7350 Via Paseo Del Sur, E#206, Scottsdale, Ariz. 85258

[21] Appl. No.: 233,451

[22] Filed: Aug. 18, 1988

Related U.S. Application Data

[63] Continuation-in-part of Ser. No. 015,886, Feb. 18, 1987.

[51] Int. Cl.⁴ .............................................. B41J 5/10
[52] U.S. Cl. .................................... 400/489; 400/485; 400/482
[58] Field of Search ............... 400/472, 479, 485, 489, 400/479.2, 715, 473, 472, 480–486, 488, 489, 490, 492; 340/710, 711, 365 A, 712; 341/22; 178/17 A,R,C

[56] References Cited

U.S. PATENT DOCUMENTS

| | | | |
|---|---|---|---|
| 470,874 | 3/1892 | Glidden | 400/486 |
| 760,851 | 5/1904 | Crawford-Frost | 400/485 |
| 943,466 | 12/1909 | Rowell | 400/487 |
| 1,336,122 | 4/1920 | Banaji | 400/485 |
| 1,506,426 | 8/1924 | Hoke | 400/485 |
| 2,040,248 | 5/1936 | Dvorak et al. | 197/100 |
| 2,080,457 | 5/1937 | Bower | 197/100 |
| 2,318,519 | 5/1943 | Palanque | 197/100 |
| 2,369,807 | 2/1945 | Solon | 197/98 |
| 2,532,228 | 11/1950 | Hesh | 197/13 |
| 3,022,878 | 2/1962 | Seibel et al. | 197/19 |
| 3,633,724 | 1/1972 | Samuel | 197/100 |
| 3,698,532 | 10/1972 | Dodds | 197/100 |
| 3,847,263 | 11/1974 | X | 197/100 |
| 3,937,939 | 2/1976 | Frenkel | 235/156 |
| 3,945,482 | 3/1976 | Einbinder | 197/100 |
| 3,965,315 | 6/1976 | Wuenn | 200/6 A |
| 3,967,273 | 6/1976 | Knowlton | 340/365 S |
| 3,970,185 | 7/1976 | Shelton | 197/9 |
| 4,029,915 | 6/1977 | Ojima | 200/5 A |
| 4,201,489 | 5/1980 | Zapp | 400/485 |
| 4,211,497 | 7/1980 | Montgomery | 400/486 |
| 4,241,409 | 12/1980 | Nolf | 364/705 |
| 4,244,659 | 1/1981 | Malt | 400/486 |
| 4,255,626 | 3/1981 | Watts et al. | 200/6 A |
| 4,310,254 | 1/1982 | D'Angiolillo | 400/109 |
| 4,332,493 | 6/1982 | Einbinder | 400/484 |
| 4,584,443 | 4/1986 | Yaeger | 200/6 A |

FOREIGN PATENT DOCUMENTS

| | | | |
|---|---|---|---|
| 67069 | 4/1984 | Japan | 400/715 |
| 885074 | 11/1981 | U.S.S.R. | 400/489 |
| 2076743 | 12/1981 | United Kingdom | 400/100 |
| 8201345 | 4/1982 | World Int. Prop. O. | 400/489 |
| 8400518 | 2/1984 | World Int. Prop. O. | 400/489 |

*Primary Examiner*—Edgar S. Burr
*Assistant Examiner*—Joseph R. Keating
*Attorney, Agent, or Firm*—LaValle D. Ptak

[57] ABSTRACT

An ergometrically improved computer of typewriter keyboard having the keys arranged and designated so that they are operated using finger movements which substantially mimic those currently employed by a typist using a standard "QWERTY" keyboard. The keyboard is divided into two separate sections, one of which is intended to be used by the right hand of the operator and the other of which is intended to be used by the left hand to permit independent positioning of the two sections relative to one another. Each keyboard section includes a housing having a raised central portion designed to ergometrically support and steady the hands of the operator, in a natural relaxed position from which all of the keys may be operated without significant hand movement. The fingers and thumb are positioned in respective cavities each having a plurality of push button key switches arranged therein for engagement by the thumb and fingers, with a minimal and unique finger movement required to actuate any key. Each key touches a different part of each finger, providing differential tactile feedback. The fingers and thumbs never need to be moved from the cavities which eliminates all "float", and the hands are continually supported in one comfortable position. Extensive utilization of the thumbs is provided. The device is smaller and more versatile than a conventional keyboard.

22 Claims, 4 Drawing Sheets

ALPHA-NUMERIC KEYBOARD

RELATED APPLICATION

This application is a Continuation-In-Part of co-pending application Ser. No. 07/015,886, filed on Feb. 18, 1987.

BACKGROUND

The transmission of alpha-numeric information from one person to another currently essentially is carried out by means of four different data entry techniques. These include sticks (chisel on stone, pencils, pens, markers, and the like), keyboards (typically used with typewriters, computers, and word processors), spatial devices (computer "mice", track balls, joy sticks, and the like used with computers); and voice (direct human communication and voice responsive computer systems). At the present state of technology, word processors and computers primarily rely upon data entry keyboards and the various spatial devices for inputting information into the computer, electronic typewriter, or word processor for subsequent display and/or printing. Of these techniques, keyboards are the most widely used today and many computers use a combination of keyboards and spatial devices (such as the movable "mice" which have become highly popular since 1980 for example on the Apple McIntosh Computer).

The now standard keyboard character assignment used in conjunction with typewriters and computers has what is known as the "QWERTY" key arrangement. This designation is named after the top row of letters in the four row keyboard. The "QWERTY" arrangement was invented and patented over 100 years ago and resulted from some unique characteristics of the all mechanical typewriters which existed at the time of the invention. One problem with early mechanical typewriters was that the entire force for providing the mechanical energy used to operate most of the typing function was provided by the force with which the key was struck. In addition to moving the typebar, this force also g released the carriage and moved the ribbon forward, with no other energy source.

Early keyboards utilized a simple alphabetic layout, but it was quickly discovered that the typebars of the early, crude, mechanical typewriters frequently jammed once a typist learned "QWERTY" keyboard was developed to place the most commonly used letters in English at the opposite sides of the type basket. The keyboard itself was laid out to provide direct mechanical connections to the various letters. Consequently, many of the commonly used letters were placed away from the "home" (center) row where the fingers normally rested. In addition, the "QWERTY" keyboard was designed with another slow-down technique by causing common letter pairs to be struck by the same finger on the same hand. This is the slowest motion for successive letters which could be developed. The "QWERTY" keyboard also introduced two function keys, the "CAP LOCK" and "SHIFT" keys, which allowed upper and lower case letters to be activated by the same keys and allowed the upper row of keys (the numbers and punctuations) to share the same keys. This was in contrast to typewriters less advanced than "QWERTY" which had eight rows of keys instead of the basic four rows for "QWERTY". The early widespread popularity of the "QWERTY" mechanical typewriter resulted in a nearly universal adoption of the "QWERTY" keyboard layout.

The "QWERTY" keyboard continued to be used, because of widespread mastery by secretaries and data input operators, even after the reasons for its original development no longer were applicable. Electric typewriters eased the finger burden by allowing the keystroke to mechanically access an electric motor which then provided the energy to complete the mechanical process of printing and operating the other mechanism of the typewriter. Electric typewriters in turn have been replaced by electronic typewriters, word processors, and computers which completely eliminate the necessity for the inefficient "QWERTY" keyboard layout. This layout, however, has continued to dominate the market today, long after its need has disappeared. Computer keyboard buffers, which separate too quickly struck keys eliminate all of the problems which the "QWERTY" keyboard originally was designed to overcome.

Efforts have been made to modify the layout of multi-key keyboards to improve efficiency. One such keyboard is disclosed in the keyboard to Dvorak U.S. Pat. No. 2,040,248. This keyboard was designed after an analysis of errors made with the standard "QWERTY" layout. The Dvorak layout concentrates the vowels and most frequently used letters on the "home" row so that there is much less moving around from row to row of the fingers of the typist. It has been found that this row to row movement in "QWERTY" keyboards and other multiple row keyboards results in most of the errors made by typists. In addition, the Dvorak keyboard change the balance between the left and right hand. In a "QWERTY" keyboard the usage is 57% for the left hand, whereas in Dvorak the change is to 56% for the right hand, better suited for right handed typists. Although the Dvorak keyboard has been known for over 50 years, it has not made many in-roads into the standard "QWERTY" keyboard world. Even with their greater efficiency, Dvorak keyboards still are subject to the requirement of movement of the fingers over four rows of keys (when a number row is provided). This is inefficient and inherently presents a capacity for introduction of errors when the fingers move with little or no tactile feedback from one row to another away from the "home" row.

Other efforts at providing a more natural arrangement of keys to fit the natural shape of the hand and to utilize the significantly greater dexterity of the thumbs is typified in the keyboard arrangement of Malt U.S. Pat. No. 4,244,659. With ordinary keyboards such as the "QWERTY" and Dvorak keyboards, the eight fingers are used to produce all of the key strokes and the thumbs (primarily the right thumb) are used solely to operate the space bar. The thumb of the human hand, however, has more capability of finger movement than the index finger and is the most important and most-used digit of the hand. Malt recognized this and assigned each thumb six different keys or functions. In addition, the keys are laid out in a curved arrangement corresponding to the different lengths of the fingers on each hand. The keys for each hand also are separated into two groups with the thumb positions adjacent one another. Even though it appears to be a more efficient layout than a standard "QWERTY" keyboard, the Malt keyboard arrangement has not been widely adopted. Once again, the fingers (and the thumbs) must move over multiple rows of keys; so that row to row and key to key movement errors still may be introduced with the Malt keyboard.

Other types of non-standard keyboard character assignments have been developed over the years in addition to the Dvorak and Malt keyboards discussed above; but in view of the minimal advantages obtained from such assignments over the standard "QWERTY" arrangement, no overriding reason has been presented to the industry to modify the well-established and well-known "QWERTY" keyboard arrangement.

An entirely different approach has been undertaken by others in the past to provide multiple switches or key assignments at each of several different fixed finger locations. Such an approach is disclosed in the Hesh U.S. Pat. No. 2,536,228. This patent is for an electrically operated typewriter in which the keyboard location of the typewriter has been modified to provide two groups of five semi-circular keys. These keys underlie the thumb and forefingers, respectively, of the left and right hands. Each key may be operated by pivoting it forward, backward, left, right or by pushing it straight down to obtain five different outputs from each key position. These outputs then are used to operate the otherwise conventional mechanism of the electric typewriter. Similar arrangements are shown in the Samuel U.S. Pat. No. 3,633,724 (for a typewriter) and Wuenn U.S. Pat. No. 3,965,315 (for a calculator). The Samuel typewriter employs only eight pivoted keys and utilizes the conventional space bar, return, and shift keys normally associated with standard typewriter keyboards.

The systems of Hesh, Samuel, and Wuenn, since they are placed on flat keyboard-like surfaces, do not provide support for the hands and fingers of the operator even though the layout of Hesh does place the keys in a semi-circular arrangement conforming to the relaxed position of the fingertips and thumb of each hand. It is very difficult for a keyboard operator to maintain the hands and fingers in a closely confined space unless a supporting and stabilizing structure is provided.

A variation of the multiple switch location for each finger is disclosed in the keyboard of the Runge U.S. Pat. No. 4,265,557. The system of this patent provides clusters of keys operated by each finger. The keys of the cluster are closely associated around the finger in its "home" row position. One key rests above the operator's finger and is operated by raising the finger. There also are keys behind and in front of the conventional "home" row key, so that each finger is capable of operating four different keys or switches from the "home" row position. The Runge device "locks" the fingers into narrowly defined locations without providing physical support or tactile feedback for the hands and arms to maintain the precise locations required. As a practical matter, this makes maintaining the fingers and hands in the precise location extremely difficult and fatiguing for more than brief time periods. Runge does not take advantage of the capabilities of the thumb, however, which simply is left to operate a conventional space bar. The Runge device is a g relatively complex set of mechanical lever arms subject to misadjustment and wear.

An even more innovative approach is disclosed in the Seivel U.S. Pat. No. 3,022,878. The "communication device" of this patent is an enclosure into which the hand is inserted. The four fingers and thumb are placed into switch positions where each finger and the thumb are capable of operating two different sets of switches (one set when the fingers are drawn in toward the palm of the hand and another set when the fingers are moved outwardly from the palm of the hand). Different alphanumeric characters and other function characters then are provided by encoding different combinations of the operation of these various switches. A complex set of multiple finger operations is necessary to produce the different characters and commands from the device. One advantage of the Seivel device, however, is that the hand is not constrained to rest on a standard keyboard attached to a machine such as a typewriter, since the device of Seivel may be moved around by the operator during use.

A conceptual illustration of a semi-captive keyboard employing multiple key operations from each of the fixed finger positions is shown in the "*Xerox Disclosure Journal*". Volumes 1, No. 2, February 1986 (Page 85). No details of the keyboard are shown, but it essentially comprises a generally flat plate on which the hand is placed palm down, with the fingers and thumb extended. The fingers and thumb appear to enter into openings in a vertical, raised portion adjacent the flat palm receiving portion. In these openings, clusters of keys are placed around the fingers for operation by each finger. As illustrated, however, this device has a major operational problem in that the finger enclosures are arranged with the fingers extending horizontally and parallel to the rest of the hand. As a result, actuation of the key surface in front of each fingertip requires forward movement of the entire hand, displacing the hand from a "home" position and making the selective actuation of only one such finger key extremely difficult, if not impossible. This device also does not reveal how the thumb could successfully actuate the keys. This disclosure lacks sufficient details for implementation into an operative system.

Another conceptual illustration of a difficult-to-master keyboard is given in the IBM Technical Disclosure Bulletin Volume 52, No. 9, Pages 4915 and 4916 (February 1983 to Uchiyama). This keyboard is in separate left and right sections with a single key at each finger location. It is a chording keyboard where multiple key (multiple finger) simultaneous combinations are made, then followed by an "execute" operation to provide the desired outputs. Chording keyboards require substantial memorization of the combinations to master, and do not provide direct correlation of and indentification of the specific finger movements which cause any errors.

Another patent directed to a formed data entry device for generation of multiple symbols through chording operation is disclosed in the United Kingdom Patent to Winkler No. 2,076,743. The upper surface of this data input device is shaped so that the hand of the operator may rest on it in a relaxed position. The base of the device supports the palm of the hand. The Winkler device is made with grooves in it to accomodate the fingers and essentially hold them immobile. Pressure sensitive switches are employed and they are located under the knuckles to be actuated by bony parts of the fingers. The device of Winkler has a total of approximately eight keys. These include one key underlying each knuckle of each of the four fingers, two keys for the thumb, and keys for left and right hand sides of the palm of the hand. Thus, the device is not made for resting the palm of the hand with any pressure since pressure actuates the keys located under the palm. Data entry is accomplished by the actuation of multiple keys in various combinations to generate permutations of keys which are interpreted as equivalent to a particular data entry key of a conventional keyboard. Different combinations of two or more keys are required for the various letter, number, punctuation and function symbols required for computer operation. This requires a very complex learning process for an operator, since the chording representations must be memorized and the key operations consequently are significantly different from those required for a standard typewriter keyboard.

The Yaeger U.S. Pat. No. 4,584,443 and the French Patent WO No. 82/01345 to Kroczynski are directed to an entirely different type of data input device. In Yaeger and Kroczynski elongated bars are worn on the hands of an operator. In Yaeger, ends of the fingers of the operator are inserted into circular cups which captivate or hold the fingers within the cups. Each cup in turn is mounted on a spring to permit rocking motion in any one of two or three directions and, in some cases, downward or forward movement as well. Thus, each cup constitutes a single key. As constructed, the device of Yaeger always must return the cup to its neutral or home position before it can be used to actuate a switch in any other direction. The fingertips or fingers of the operator of the Yaeger device are not freely received within fingertip wells but instead are held captive in continuous contact with a single key or switch.

The Yaeger device essentially is "worn" by the operator since it attaches to the hands like a glove with the thumb being completely incased in a rigid tube. In Kroczynski, the fingers fit within an enclosure, so different parts of each finger operate different switches.

It is desirable to provide an improved data input device in the form of a finger actuated keyboard which overcomes the disadvantages of the prior art and which is more natural to use than standard or modified keyboards of the prior art, which is particularly suitable for utilization as a computer input keyboard, and which is easy to use and quick to learn.

SUMMARY OF THE INVENTION

It is an object of this invention to provide an improved keyboard.

It is another object of this invention to provide an improved ergometrically superior alpha-numeric keyboard.

It is an additional object of this invention to provide an improved keyboard which is of smaller size and of greater capacity than conventional keyboards.

It is a further object of this invention to provide an improved keyboard in which the hand always remains in one structurally specified "home" position from which it need not be moved to the thumb for performing multiple operations.

It is yet another object of this invention to provide an improved keyboard which is made in two sections, one for the left hand and one for the right hand, and which includes a graspable center portion, with the hand always located in one structurally specified "home" position from which it need not be moved in order for the finger to operate multiple key switches to produce the desired outputs.

It is yet an additional object of this invention to provide an improved keyboard which is capable of operation through generally similar directional finger movement corresponding to standard "QWERTY" touch typing to actuate most of the character keys including at least some keys accessed by lateral finger movement in standard "QWERTY" keyboards, but without requiring the hands to leave a specified "home" position.

In accordance with a preferred embodiment of this invention, a keyboard for controlling data input includes a keyboard housing with a raised central portion adapted to generally underlie the palm of a hand. Thumb and finger positions are distributed adjacent the raised central portion in a pattern generally corresponding to the relaxed position of a hand when the palm of the hand is placed on the central portion. At each of the thumb and finger positions, a cluster of switches is arranged in a preestablished pattern for operation by the finger or thumb at each such position. Each of the switches then are coupled with a suitable processing device.

DETAILED DESCRIPTION

Figure 1A:
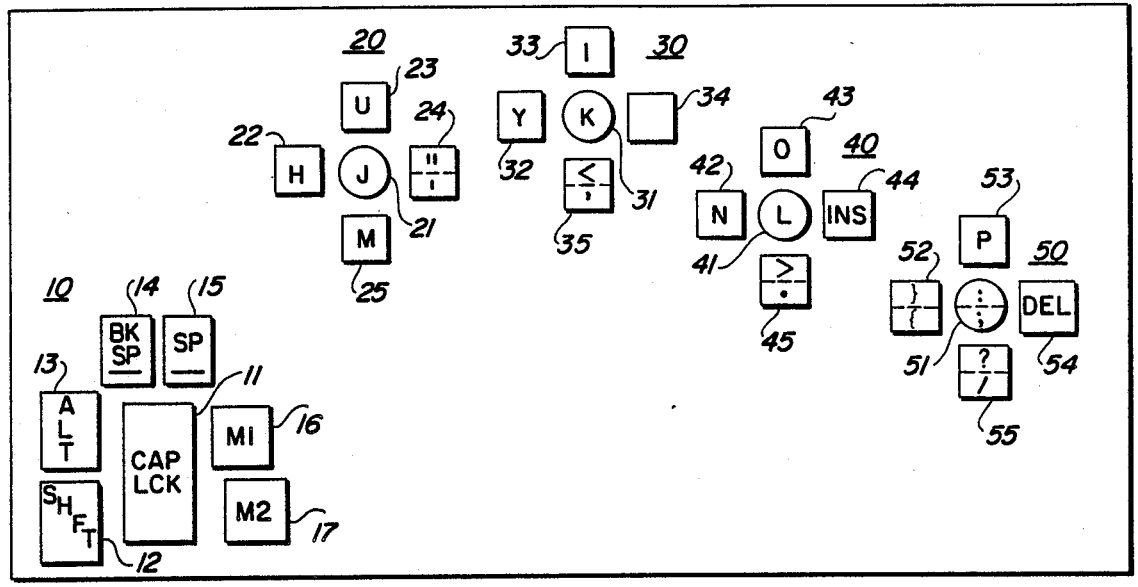
FIGS. 1A and 1B illustrate a feature of a preferred embodiment of the invention.
Figure 1B:
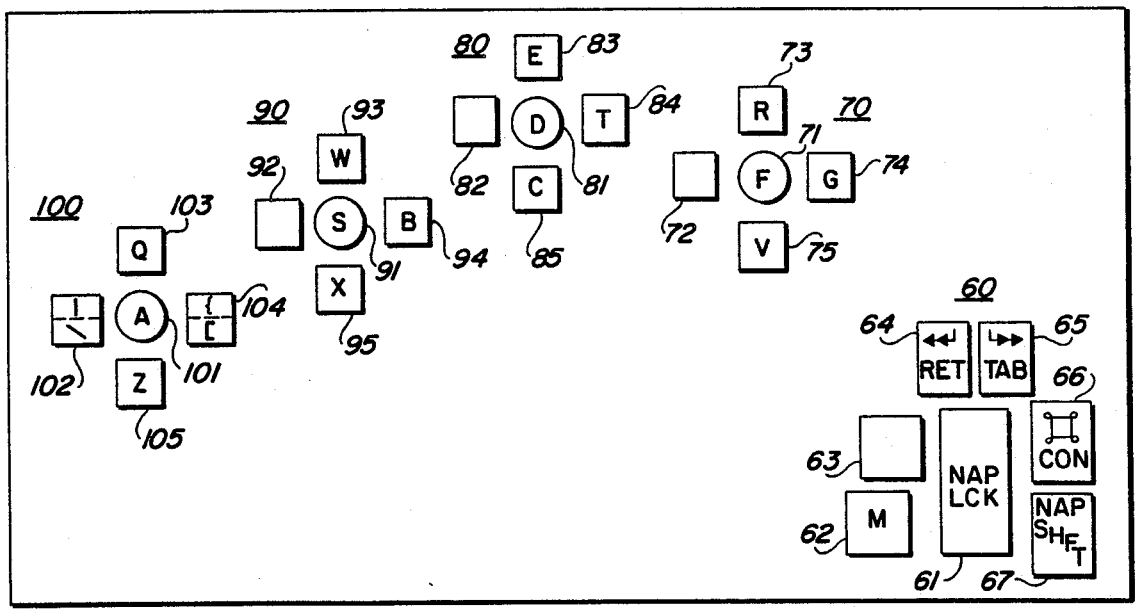

Reference now should be made to the drawings in which the same reference numbers are used throughout the different figures to designate the same or similar components. Attention first should be directed to FIGS. 1, 2, and 3 (divided into A and B sections, for the right and left hands, respectively) which illustrate the key switch assignments for a preferred embodiment of the invention. Reference first should be made to FIGS. 1A and 1B which illustrate key assignments for normal operation of keyboard in its alphabetical mode of operation.

The keyboard layout, as illustrated in FIGS. 1A and 1B is in two separate parts, representing the right hand (FIG. 1A) and the left hand (FIG. 1B), respectively. The different keys to be operated by each hand are arranged in a cluster or patterns generally conforming to the fingertip and thumb position of a relaxed hand placed in the palm-downward position. The patterns for each of the hands are illustrated in FIGS. 1A and 1B. For the right hand, the thumb position 10 is illustrated along with four finger positions 20, 30, 40, and 50, for the corresponding fingers of the right hand.

Each of these different key positions comprises a cluster of key switches to which are assigned different letters or symbols associated with that position. For example, the right thumb position 10 has a CAP LOCK key 11 located in an area underlying the thumb. To the left of the key 11 are two other keys 12 and 13 corresponding to "SHIFT" and to "ALT" for computers. Similarly above the CAP LOCK key 11, as illustrated in FIG. 1A are a BACKSPACE key 14 and a SPACE key 15. To the right of the key 11 are two operational keys 16 and 17 designated "M1" and "M2" respectively. Similarly, as shown in FIG. 1B, the left hand thumb position 60 has a "NUMBER AND PUNCTUATION" (NAP LOCK) key 61. To the left of this key 61 are a pair of keys 62 and 63, the key 63 is undesignated and the key 62 is designated "M" for a "mouse" control function. Above the key 61 are a RETURN key 64 and a TAB key 65. To the right of key 61 for the left hand thumb SHIFT key 67.

For each of the fingers, there is a cluster of five keys constituting a central or base key 21, 31, 41, and 51 for the right and and 71, 81, 91, and 101 for the left hand. These keys, as marked in FIGS. 1A and 1B underlie the fingers and constitute the same key designations which exist for the "home" row of a "QWERTY" standard keyboard, namely A, S, D, F, J, K, L, and :/;. As illustrated in FIGS. 1A and 1B, four other keys exist above, below, to the left and to the right of each of these "home" or base key positions. These other keys carry designations which once again are comparable to the standard "QWERTY" keyboard for movement of the corresponding finger to a different row or to an adjacent key position (as the case may be) for such a standard keyboard. In the keyboard illustrated in FIGS. 1A and 1B, however, the hand never leaves one structurally specified "home" position, but the fingers or thumbs merely make relatively small movements in the corresponding direction of the keys surrounding them to effect operation of the surrounding key switches in the operation of the keyboard of the invention.

In the normal alphabetic mode of operation of the keyboard illustrated, the operation of the various keys provide the output designated in FIGS. 1A and 1B. Out of the natural alphabet of 26 letters, all but four of these letters are exactly were a "QWERTY" typist would expect to find them. Even these four keys, however, are still operated by the same hand and by a finger close to the finger used by a "QWERTY" typist. In addition, the most common punctuation keys (comma, period mark, and semi-colon) are all where a "QWERTY" trained typist would expect to find them. As a consequence, a person who is skilled in typing on a conventional "QWERTY" keyboard readily adjusts to the keyboard illustrated, since the finger movements required to activate the majority of characters is similar to the same finger movements used on a standard "QWERTY" keyboard, including most of the lateral movements. In addition, the original "slow-down", same finger, "QWERTY" movements now are rapidly effected by a generally circular or linear continuous motion of the finger which never leaves its "home" position (such as the "E/D" combination).

It should be noted that in contrast to standard keyboards which essentially do not utilize the thumb at all (except to operate a space bar) the keyboard illustrated in FIGS. 1, 2, and 3 fully utilizes the left and right thumbs. The thumbs are the most fully articulated digits on the human hand. Consequently, the keyboard of this invention uses each thumb to control up to seven different keys, as is readily apparent from an examination of FIGS. 1 through 3. As a result, the thumbs together control up to 14 separate functions. This significantly expands the potential capabilities of the keyboard while limiting each of the fingers to five basic movements, namely down, away from the body, toward the body, left, and right.

The layout of the alphabet keys illustrated in FIGS. 1A through 1B, along with the most widely used punctuation, closely follows the "QWERTY" standard keyboard so far as the actual finger motion is required. The finger motion, however, is reduced to a matter of millimeters instead of the significantly long reaches necessary for a standard "QWERTY" keyboard. This eliminates the difficult and disorienting "floating" which exists for most operators of "QWERTY" keyboards (that is moving the fingers off the "home" keys and then finding and pressing the proper key). The function operation keys (space, shift, ALT, control, tab, return, et cetera) are controlled exclusively by the two thumbs, and these function keys never change throughout the operation of the keyboard in its various modes of operation. In addition, as becomes apparent from an examination of the key designation layouts of FIGS. 1 through 3, intuitive logic and parallel functioning of the right and left hands makes learning the keyboard layout of this new keyboard simpler than learning a conventional "QWERTY" keyboard.

Figure 2A:
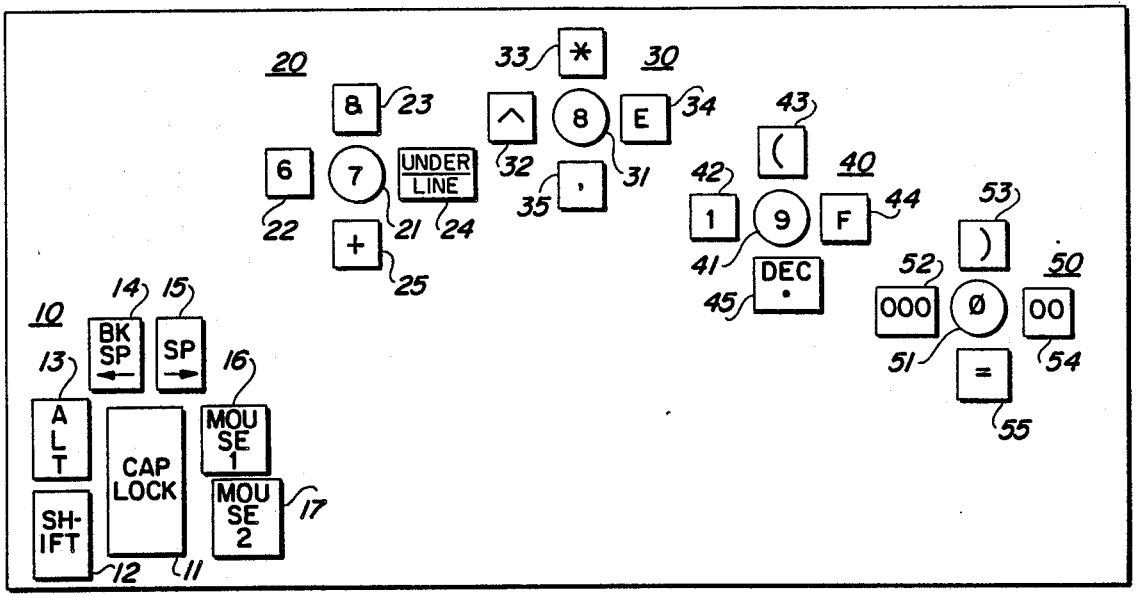
FIGS. 2A and 2B illustrate another feature of a preferred embodiment of the invention.
Figure 2B:
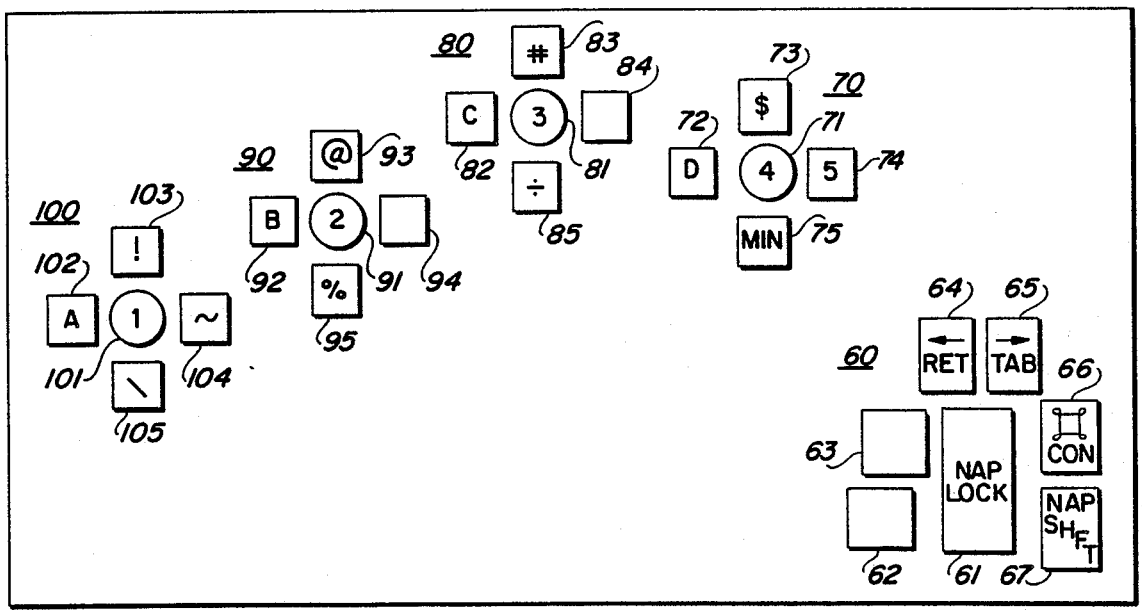

Reference now should be made to FIGS. 2A and 2B which illustrate, respectively, the right hand and left hand designations for the NAP mode (Numerical And Punctuation) mode of operation. This is to be contrasted with the normal mode discussed above in conjunction with FIGS. 1A and 1B. The same key reference numbers are used in FIGS. 2A and 2B, but the symbols which correspond to operation of the keys when the NAP different keys. This NAP mode is a new mode of operation. The use of the NAP mode allows the simultaneous achievement of two important features, namely, (1) the hands need not leave their respective structurally determined locations established by the support surfaces for the palms of the hands in order to access the numeric and punctuation keys; and (2) the operation of the numeric and punctuation keys is accomplished by finger movement similar to the finger movements used in operating a standard "QWERTY" touch typing keyboard and governed by simple consistant rules of substitution. Use of the NAP mode also reduces the number of key strokes required for common financial mathematical, or spreadsheet formulas and the like; because the punctuation frequently used with numbers (such as plus, minus, slash, asterisk, equals, et cetera) and the common unit indicators ($, % and #) all are simultaneously available without mode change. This is readily apparent by the designations marked on the keys at the different key positions in FIGS. 2A and 2B.

By the use of the NAP mode, the keyboard makes available the numeric and punctuation keys normally present on the fourth row of a "QWERTY" keyboard and elsewhere without removing the hands from the "home" positions. Once again, this is in strong contrast to a standard "QWERTY" keyboard or to a combination ""QWERTY"/Calculator" type keyboard used with many computers which includes a separate numerical keypad off to the right of the normal alphabetical typing position. Since the hands remain in the "home" positions, the conventional keyboard problems of having to do a long, difficult float to the upper-most row of keys on a conventional keyboard, or to completely transfer the hands from the regular keypad to a numeric or special keypad are eliminated.

In addition, in the NAP mode illustrated in FIGS. 2A and 2B, having "A, B, C, D, E, F, and G" as available keys within this mode allows a full hexidecimal data entry all without requiring a mode change or removal of the hands from the "home" positions. These hexidecimal designations are provided in both the left and right hand positions, by a leftward movement of the corresponding fingers of the left hand and by a rightward movement of the corresponding fingers of the right hand (mirror image movements). In addition, in the NAP mode of FIGS. 2A and 2B, the particular assignment of keys allows the numbers to serve as the under-finger or beneath-finger of the "home" keys; and the punctuation and special characters (available on a standard keyboard only by a combination of "shift" plus a numbered key) are accessed by the key above (that is the key actuated by extending the finger forward away from the body) the under or beneath-finger "home" key. For example, the asterisk (*) character is located in the NAP mode on the key above the "home" key of the right middle finger that, in the NAP mode, is the numeric character "8" and the "$" is located on the key above the left index finger home key (the number "4" key in the NAP mode). This all is accomplished in a fashion which is intuitively transferable from the corresponding locations learned by a conventional "QWERTY" touch typist, since nearly identical finger movements are employed to access the same characters with both systems.

Because of the significant versatility which exists in the keyboard arrangement, another totally different new mode of operation is available which is particularly suited for operating assigned function keys for various computer programs. This is accomplished by a combination or simultaneous operation of the "CAP" and "NAP" mode of operation. As noted in all of FIGS. 1A, 2A, and 3A, capital letters are operated by either operating the SHIFT key 12 or the CAP LOCK key 11 in a manner similar to the operation of the NAP SHIFT key 67 and NAP LOCK key 61 described previously.

Figure 3A:
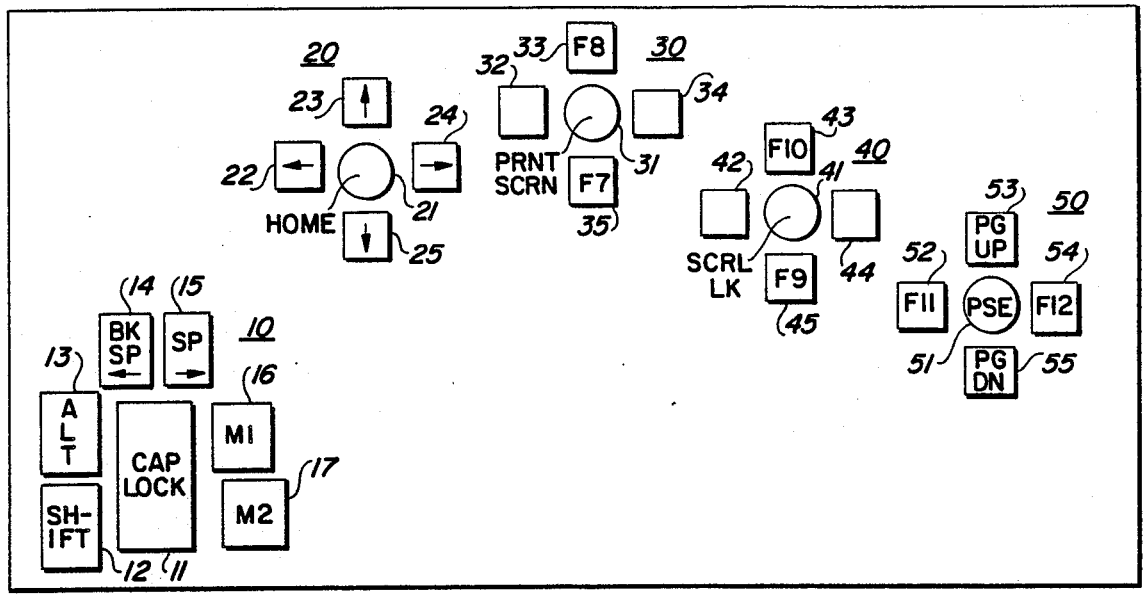
FIGS. 3A and 3B illustrate a further feature of a preferred embodiment of the invention.
Figure 3B:
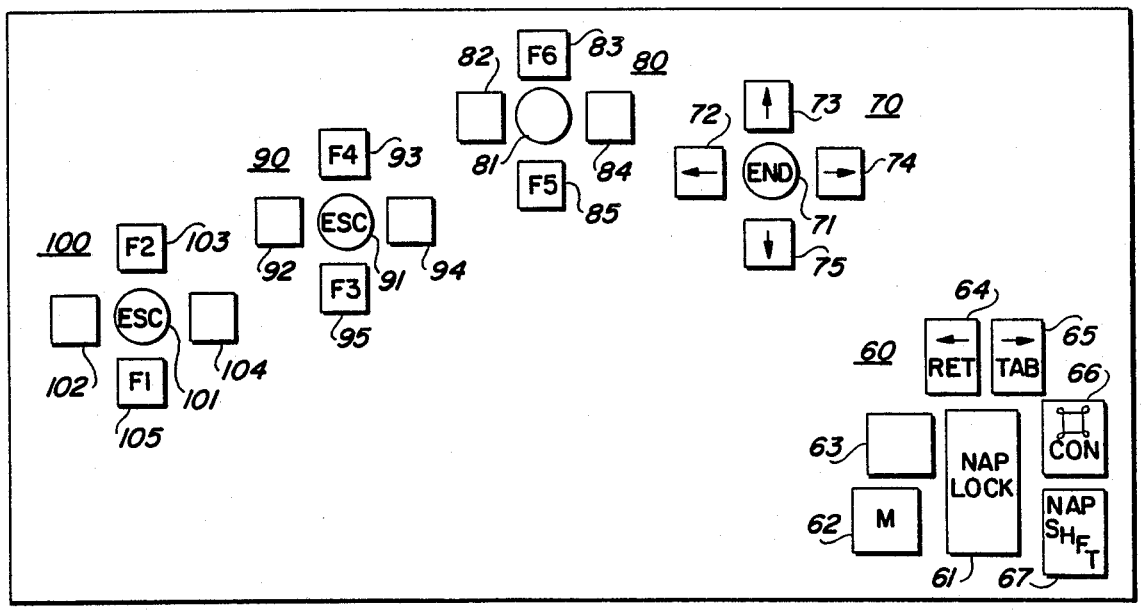

By selecting these two modes simultaneously, forty additional key assignments are available for utilization of the keyboard. These assignments have been designated as illustrated in FIGS. 3A and 3B, the various marked functions and functions "F1" through "F12", respectively. In addition, for the positions adjacent the index finger of the right hand, up, down, left, and right "rapid" or course movement cursor keys are distributed in the logical up, down, left, and right positions 23, 25, 22, and 24, respectively. This is an intuitively obvious function assignment of moving the cursors in the direction they are pushed by the finger operating in this position. In addition, an operator easily may jam the right index finger simultaneously against both the upper and right keys to produce a diagonal upper-right movement of the cursor. Other diagonal movements similarly are effected by such composite index finger movement. Similarly, the index finger of the left hand operates a set of corresponding "slow" or vernier cursor movement keys in the same manner. Thus, this new mode of keyboard operation permits a more efficient degree of cursor control. The two cursor contols may be integrated into a composite cursor control signal for a single cursor, if desired.

As is readily apparent from an examination of FIGS. 3A and B, a large number of additional functions are left unassigned; and these may be individually assigned for particular programs to be operated by the keyboard in accordance with function key designations for those programs. Because such a large number of function key assignments are possible, many of the multiple key operations which are common with conventional "QWERTY" keyboards used as computer input devices may be eliminated. For example, it is possible to eliminate some of the "ALT" key operations with other letters which have become commonplace when "QWERTY" keyboards are used as computer input devices.

In conjunction with all of FIGS. 1, 2, and 3, it should be noted that the thumb controls, which are the same in all modes of operation, are significant. First, all of the function operation keys are controlled by the thumbs, so that their use never conflicts with operating any other character keys by the eight fingers. For example, the SHIFT key 12 can be held, operated, or engaged by the knuckle of the right thumb and this will not interfere with any other finger actuation of any other key on either hand. This is to be contrasted to a conventional keyboard where, for example, holding down the SHIFT key with the right little finger, makes it impossible to simultaneously use that finger to strike the "APOSTROPHE" or "QUOTE" key and also makes it difficult to reach the "Y" key. In addition, all of the common special, non-character keys (SPACE, BACKSPACE, SHIFT, CAPS LOCK, ALT, MICE ON, RETURN, TAB, NAP SHIFT, NAP LOCK, OPTION and CONTROL) are controlled by the thumbs exclusively. This permits a logical grouping that differentiates these keys from the character keys. The character keys are used solely for the purpose of character input or for function input (for the combination NAP/shift) mode of operation. Since the functions of all of the thumb keys never change, irrespective of the mode of operation of the keyboard, these keys are a constant reference; and remembering their functions becomes easier.

Some current computer programs use control sequences which require simultaneous operation of pairs of keys. Such keys are all thumb operated and are arranged to permit such simultaneous operation, either by locating them side-by-side or diagonally across from one another.

As is more apparent from a subsequent discussion of FIGS. 4 through 8, the right thumb tip controls both the SPACE and BACK SPACE keys 15 and 14, respectively. Typists are accustomed to using the right thumb for the space function. Because the SPACE key 15 moves the insertion point to the right, it is located to tip forward on the left key (key 14) moves the insertion point to the left (backspace). Similarly, pushing the right thumb top forward on the right hand key 15 moves the insertion point right (space), which is an intuitively logical and easily remembered arrangement.

The left thumb closely parallels the right thumb in function in various ways, so that the learning process is made simpler and the key use more intuitive and more easily remembered. For example, the left thumb top (the B figures of FIGS. 1 through 3) controls the TAB key 65 and RETURN key 64. With an operation design paralleling the right hand, the thumb tip key which is to the left on the left hand actuates the RETURN key 64. The thumb tip key 65 which is engaged by an operational move of the left thumb to the right actuates the TAB key 65. Thus, the left key moves the insertion point to the left and the right key moves it to the right. This is a logical, easily remembered assignment of these functions.

The SHIFT key 12 is actuated by flexing the right thumb outward to engage the key 12. CAP LOCK key 11 is actuated by pushing down the locking key located directly below the right thumb. The CAP LOCK key 11 may provide tactile feedback by physically locking in the lowered position and popping up when released. A similar function exists for the NAP LOCK key 61. The NAP LOCK key 61 and the NAP shift key 67 operate analogously to the SHIFT key 12 and the SHIFT LOCK key 11, except that these keys 67 and 61 are controlled by the left thumb. The SHIFT key 12 and the NAP SHIFT key 67 are designed to be actuated by the respective thumb knuckles. This is accomplished by a jamming and bracing action which has the effect of making it practical to simultaneously activate one of the character keys with a finger on the same hand, or even other simultaneous thumb functions; for example "SHIFT" and "ALT", or "SPACE" may be simultaneouly operated by the thumb.

Two other functions for the right hand are the mouse "click" or mouse buttons 16 and 17, which are actuated by the right thumb and are designed to be compatible with an inward thumb pressure. This is a natural gripping function of the hand; and for keyboards with a mouse incorporated (not shown), it is a convenient and natural increase of the grip on the right hand keyboard unit during the time it may be moved to produce a mouse control. A similar mouse "click" button 62 is provided for the left thumb or the left hand keyboard unit.

Figure 4:
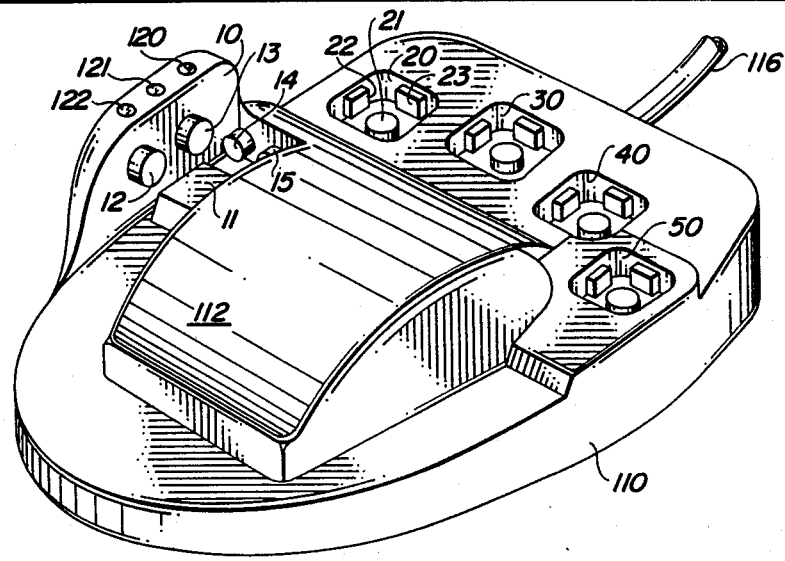
FIG. 4 is a perspective view of a preferred emboidment of the invention.

An understanding of the physical structure now may be gained by reference to FIGS. 4 through 8. FIG. 4 is an overall perspective view of the right-hand portion of the keyboard, the key designations of which are illustrated in FIGS. 1A, 2A, and 3A. The right-hand keyboard comprises a base 110 with a raised central portion 112 which is designed to underlie and fit against the palm of the right hand. The thumb is inserted into the key switch position 10 which is in the form of a three sided opening adjacent the thumb which effectively wraps around and extends into the opening from the lower left along side the raised central portion 112 as viewed in FIG. 12. Each of th four finger positions 20, 30, 40, and 50 are rectangular wells located to the upper right of the raised central portion 112 of the device as viewed in FIG. 4. The locations of the thumb position 10 and the wells 20, 30, 40, and 50 are selected to correspond to a natural relaxed position of the hand; so that the fingertips of the index, middle, ring, and little finger freely extend into the wells 20, 30, 40, and 50, respectively, when the thumb extends alongside the left hand edge of the raised portion 112.

Key switch designations for those switches in the thumb position 10 and the index finger position 20, which correspond to the similarly numbered positions in FIGS. 1A, 2A and 3A, are indicated for these positions. The corresponding numbering has not been provided for the other positions (30, 40, 50) in order to avoid unnecessary cluttering of the drawing. The switches close contacts, respectively, to supply signals over a cable 116 of the type commonly used with standard computer keyboards to operate associated processing circuitry to perform the function called for by the operation of the various keys for the keyboard.

Three indicator lights 120, 121, and 122 are incorporated alongside the thumb position 10 in the upper wall to the left of the position 10 to provide an indication of the mode of operation of the keyboard. When all of the lights are off, the keyboard is operated in its lower-case alphabetic mode illustrated in FIGS. 1A and 1B. When a green light 120 is illuminated, the keyboard is operated in the SHIFT (upper case) mode, which means that the thumb switch 12 is operated. A yellow light 121 is used to indicated that the CAPS LOCK switch 11 is on or closed, and a red light 122 is used to indicated that the NAP mode has been selected. A combination of both the yellow light 121 and red light 122 on indicates that the combination NAP and CAPS LOCK mode, illustrated in FIGS. 3A and 3B, has been selected. Consequently, an operator readily may ascertain the state of operation of the keyboard by reference to the condition of the indicator lights 120, 121, and 122.

Figure 5:
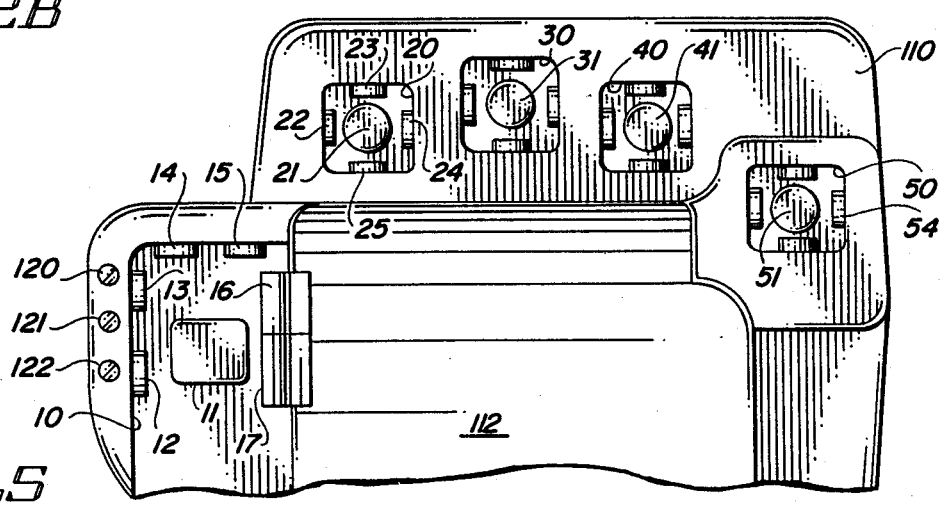
FIG. 5 is a top view of a portion of the embodiment shown in FIG. 4.

FIG. 5 is a top view of the key position portion of the device of FIG. 4 and illustrates the relative locations of the different switches within the thumb and finger wells 10, 20, 30, 40, and 50. The pattern of the five keys in each of the finger wells as well as the seven keys in the thumb well readily may be ascertained from an examination of this figure. Not all of the reference numbers for all of these keys are provided in FIG. 5 since the designations are identical to the layout shown in FIG. 2A located on the same sheet of drawings; and a ready comparison may be made with that figure to the layout of FIG. 5 to ascertain the reference numbers of the other keys shown in FIG. 5. To show all of these reference numbers would result in unnecessary cluttering of FIG. 5.

Figure 6:
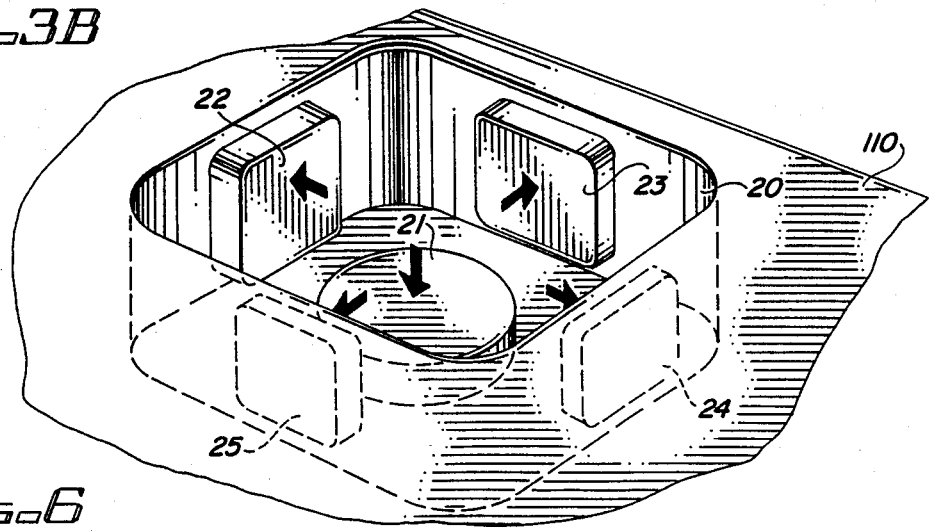
FIGS. 6, 7, and 8 show enlarged details of portions of the embodiment shown in FIGS. 4 and 5.
Figure 7:
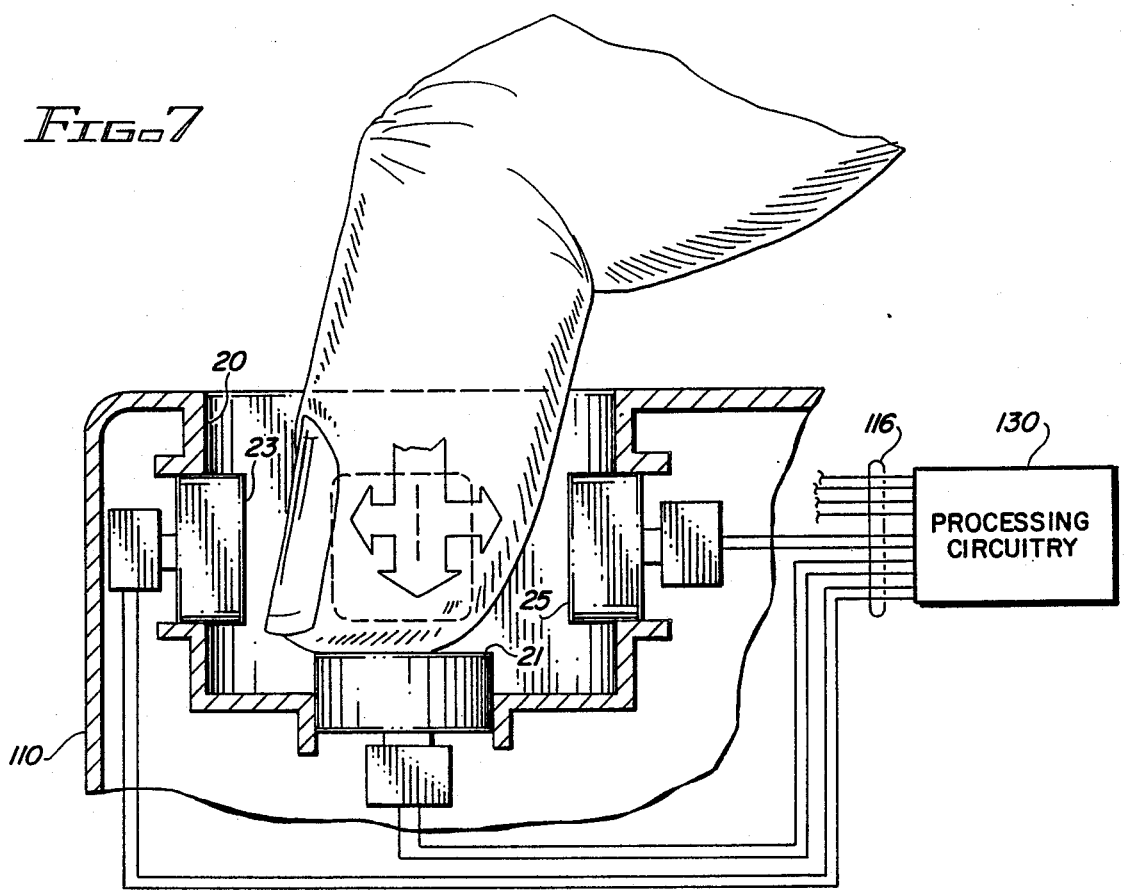

FIG. 6 is a perspective figure showing the orientation of the various keys for each of the finger wells, and the finger well 20 has been selected for purposes of illustration. It should be noted, however, that all of the finger wells 20, 30, 40, 50, 70, 80, 90, and 100 have an identical structure to the one shown in FIG. 6. FIG. 7 should be examined in conjunction with FIG. 6 and illustrates a finger inserted into the well 20 in a position capable of operating all five of the keys, depending upon the direction of movement of the finger within that well. The arrows shown in FIG. 6 show the different directions of movement which are used to effect operation of the various keys. The keys themselves operate switches, which may be of any suitable type, commonly used with data input keyboards, to close circuits thereby supplying signals over a cable 116 to processing circuitry 130.

FIG. 7 illustrates in detail the bottom switch 21, the forward switch 23 and the rearward switch 25 as operated by the right index finger of an operator placed within the well 20. From the greatly enlarged illustrations of FIGS. 6 and 7, it may be seen that relatively minor directional movements of the finger are all that is required to operate the five switches associated with that finger to produce the desired output. Comparable orientations of the fingers with respect to the keys in the other wells 30, 40, 50, 70, 80, 90, and 100, illustrated previously in the layouts of FIGS. 1 through 3 are provided for each of the remaining finger wells for the fingers of both hands.

As is apparent from FIGS. 6 and 7, each key provides a discrete tactile feedback which is differentiated from every other key. This facilitates learning of the use of the keyboard and makes immediate error detection possible. In addition, this allows for tactile verification of switch actuation. The operator finger encounters a physically separate and individually moving key surface for each intended key within each finger well. Additionally, each separate key surface contacts a separate part of the fingertip in the well in which such key surface is located. For example, one key touches the left side of the finger, one key the right side, one key the bottom, one key the front and one key the back side. Consequently, the operator is able to readily ascertain which separate key each finger is pressing against during operation of the keyboard. This provides immediate verification to the operator and opportunity to correct possible errors. On conventional keyboards, each key feels the same as every other key.

Figure 8:
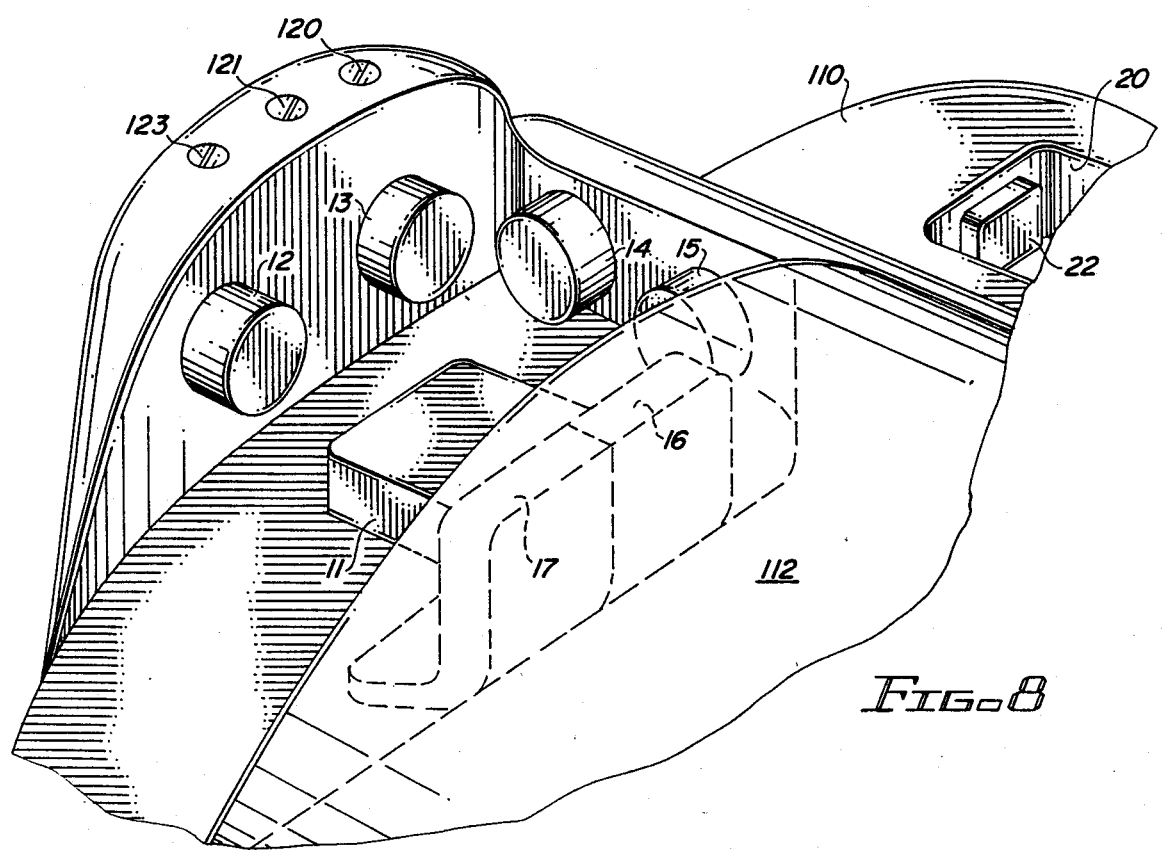

FIG. 8 is an enlarged representation of the thumb position 10 for the thumb of the right hand, illustrating the various switches opeated by the right thumb when the hand of the operator grips the raised portion 112 of the right hand portion of the keyboard. FIG. 8 is greatly exaggerated in order to more clearly show the details of the key switches 11 through 17 which are operated by the thumb of the right hand.

Only the right hand half of the keyboard is illustrated in FIGS. 4 through 8. It should be understood, however, that the physically separate left hand portion is a mirror image of the right hand portion and is identical to the right hand portion in all respects except that the key designations are those of FIGS. 1B, 2B, and 3B for the different modes of operation. Because the right hand and left hand portions of the keyboard are separate units, they may be independently moved and placed at any comfortable convenient location, either close together or spaced apart. When the two portions are spaced apart, it is possible to locate text materials directly in front of the operator between the two keyboard sections for the two hands. This placement is difficult or impossible to accomplish with conventional computer keyboards, but is a natural placement for the keyboard illustrated in the drawings.

An additional advantage is obtained from allowing the right and left hand portions to be separated at a comfortable shoulder width spacing. Specifically, this allows the unit to operate more comfortably at a desk top height (about 30" above the floor) as opposed to the lower height (about 26" above the floor) considered preferable for conventional keyboards.

It also should be noted that the construction of the two section keyboard (the right hand section of which is illustrated in FIGS. 4 through 8) results in a total area coverage of both sections which is smaller than the smallest currently available keyboard. Prototype models of the keyboard, which has been described above and which is shown in the drawings, occupy approximately 75 square inches.

One of the most popular personal computers, which has one of the smallest keyboards in popular usage, still has a footprint of approximately 88 square inches for the keyboard and required mouse. Personal computers designed for business use have keyboards which require 150 square inches to over 180 square inches. Some of these keyboards have as many as seven rows of keys. The functional difference in space required for the keyboard which has been shown and described above is even greater than the actual area of the keyboard of this invention compared to conventional keyboards. This results because conventional keyboards also require additional space for the operator to rest or float the palms of both hands. In contrast, the keyboard of this invention, and illustrated most clearly in FIG. 4, has approximately ⅔ of the entire keyboard area functioning as a built-in palm rest. This is the area under the central portion 112 of FIG. 4.

Another important consideration for the keyboard which has been described is that it essentially has 47 function keys available to the operator. The most popular business computer in its original style, has only eight function keys; and new models of this computer have increased the function keys to 12. All of the function keys of the keyboard shown in the drawings and described above are available to an operator without removing the hands from one structurally determined home position. Most function keys on other computer keyboards presently available require considerable hand movement and float in order to be accessed. This is a significant and important distinction. In addition, because all of the keys of the keyboard described above are uniquely accessible by only one finger moving in only one direction (no combination moves required) intuitive linkage to function is possible. For example, movement of the extreme left finger (the one in position 100) to left in a word processing program could actuate the key 102 and move the left margin left. Moving the same finger right could actuate the key 104, and move the left margin right. The extreme right finger also could have a parallel action on the right margin and so forth, when the keyboard is operated in the combination CAP LOCK/NAP LOCK mode illustrated in FIGS. 3A and 3B. Other logical function movements for the function mode of opertion for the keyboard also will become readily apparent to programmers and operators.

As noted from an examination of FIGS. 1A and 1B, the keyboard of this invention has a maximum of only 54 mechanical keys. Other currently popular personal computers have between 79 and 104 keys at the present time. The keyboard of this invention has fewer mechanical keys than any other common computer keyboard and yet is capable of significantly increased numbers of individual key outputs as a result of the various controls operated by the right hand and left hand thumbs.

Various changes and modifications will become apparent to those skilled in the art without departing from the true scope of the invention. For example, the shape of the keyboard device illustrated in FIG. 4 may be varied, so long as the relative positions of the thumb and finger wells remain the same for ready access by the thumbs and fingers of the operator. The particular shape of the switches also is not important and the finger wells could be circular as well as rectangular. Those character designations which depart from a strict duplication of the "QWERTY" keyboard operation also may be varied without departing from the invention, particularly for operation in the combination CAP LOCK/NAP LOCK mode which opens up the keyboard for a large number of potential "function" manipulations.

I claim:

1. A keyboard for controlling data input characters of a full set of desired including in combination:

a keyboard housing having a raised central portion devoid of keys and adapted to generally underlie and fit against the palm of a hand thereon for supporting the hand through the palm thereof resting on said raised central portion and having thumb and finger positions adjacent the raised central portion arranged in a pattern generally corresponding to the relaxed position of a hand with the fingers extending downwardly from a generally horizontal plane when the palm of the hand is placed on said raised central portion with the palm of the hand remaining in one basic position resting on said raised portion throughout operation of said keyboard;

a plurality of key switch means arranged in an overall pattern corresponding substantially to a nonchording QWERTY style key arrangement wherein each data input character is produced by actuation of a single discrete key switch means, and also arranged in additional predetermined patterns at each of said thumb and finger positions for separate actuation by the thumb and finger at each such position, with the palm of the hand remaining on said raised central portion, the key switch means at said finger positions being arranged in a first predetermined pattern at each finger position and the key switch means at said thumb position being arranged in a second predetermined pattern at such thumb position, at least each of said finger positions comprising individual, substantially vertical open-top fingertip wells in said housing for freely receiving the fingertips of an operator, each of said wells having substantially vertical walls and a bottom, with first key switch means located in the bottom of each of said wells, and at least one other key switch means located on a vertical wall of each of said wells, such that each key switch means in each well is actuated by movement of the fingertips alone without requiring movement of the hand relative to said raised central portion, each key switch means being actuated by a distinct and different portion of the fingertip in each such well to provide a different tactile feedback to the operator for each different key switch means contacted by the fingertips in each well, sufficient key switch means being provided in said wells so that the full set of desired characters and functions are accessible without requiring movement of the hand from said one basic position;

the thumb position comprising a thumb cavity having bottom and upright sides located, respectively, adjacent the end and sides of a thumb placed in said thumb cavity, with the key switch means at said thumb position comprising keys arranged in the bottom and on the upright sides of the thumb cavity in said second predetermined pattern, such that upon actuation, each such key switch touches a distinct and different portion of the thumb to provide a different tactile feedback to the operator for each different key switch contacted by the thumb; and means for coupling each of said key switch means with a processing device.

2. The combination according to claim 1 wherein said keyboard housing has an upper surface, and each of said wells extends downwardly a predetermined depth from said upper surface of said keyboard housing and is of a generally four sided shape, with said first key switch means comprising a first key in the bottom of each of said wells and second, third, fourth, and fifth keys on the four sides, respectively, of each well surrounding the bottom thereof, so that selected switches corresponding to each key in each of said wells are operated by a finger pressing downwardly to operate the key in the bottom of the well and pressing forward, backward, left and right to selectively operate each of the respective other ones of the second, third, fourth and fifth keys.

3. The combination according to claim 2 wherein said thumb position is located on one side of said raised central portion of said housing to permit said raised central portion to be grasped by the thumb of an operator.

4. The combination according to claim 3 wherein said predetermined pattern of keys at said thumb position comprises at least first and second thumb keys on one of the upright sides of said thumb receiving cavity.

5. The combination according to claim 4 wherein said thumb receiving cavity has three upright sides, and each of said three upright sides of said thumb receiving cavity has two keys located side-by-side thereon for engagement by said thumb, and the bottom of said thumb receiving cavity has a bottom key therein.

6. The combination according to claim 5 wherein said keys all comprise push button switch means.

7. The combination according to claim 6, further including a mode shift key switch means to select an operation mode and operated by a thumb to change the operating mode of said keyboard, such that for at least one finger in one operating mode of said keyboard grouped about that finger in one operating mode of said keyboard become cursor control keys corresponding to upward, downward, left and right cursor keys.

8. The combination according to claim 7 wherein each two adjacent cursor control keys are capable of simultaneous activation by one fingertip simultaneously depressing both adjacent keys to produce a diagonal cursor control signal composed of directional movement which is the mathematical sum of the two activated cursor control keys.

9. The combination according to claim 1 wherein said predetermined pattern of keys at said thumb position comprises at least first and second thumb keys on one of the upright sides of said thumb receiving cavity.

10. The combination according to claim 9 wherein said thumb receiving cavity has three upright sides and each of said three upright sides of said thumb receiving cavity has two keys located side-by-side thereon for engagement by a thumb, and the bottom of said thumb receiving cavity has a bottom key therein.

11. The combination according to claim 10 wherein said thumb position is located on one side of said raised central portion of said housing to permit such raised central portion to be grasped by the thumb of an operator placed in said thumb position.

12. The combination according to claim 1 wherein said key switch means all comprise push button switch means.

13. An improved keyboard for operating typewriters, computers and the like for controlling the data input thereto including in combination:

physically separate, independently movable, right and left keyboard housings, each having an overall external configuration substantially the size of a human hand and each having a raised central portion adapted to generally underlie the palm of a hand therein for supporting the hand through the palm thereof resting on said raised central portion, each of said right and left keyboard housings having thumb and finger positions adjacent the raised central portion thereon with such positions generally corresponding to the positions of the thumb and fingers of the respective hand of an operator placed on said raised central portion of each of said right and left keyboard housings with palm of the hands remaining in one basic position resting on said central portions throughout the operation of said keyboard, said left and right keyboard housings being mechanically independent of one another and separately movable with respect to one another;

a plurality of key switch means arranged in an overall pattern corresponding substantially to a non-chording QWERTY style key arrangement and also arranged in additional predetermined patterns at each of said thumb and finger positions of said right and left keyboard housings for separate actuation by the respective thumb and fingers of a hand placed on each of said right and left keyboard housings at such positions with the palms of the hands resting on said raised central portions, the key switch means at said finger positions arranged in a first predetermined pattern and the switch means at said thumb positions arranged in a second predetermined pattern, at least each of said finger positions comprising individual fingertip wells for freely receiving the ends of the fingers of an operator, said fingertip wells having substantially vertical walls and a bottom, with first key switch means located in the bottom of each of said wells and at least one other key switch means located on a vertical wall of each of said wells, such that each key switch means in each well is operated by movement of the fingertip alone without requiring movement of the hands relative to said raised central portions, each key switch means being actuated by a distinct and different portion of the fingertip in each such well to provide a different tactile feedback to such operator for each different key switch means contacted by the fingertips in each well.

14. The combination according to claim 13 wherein each of said keyboard housings has an upper surface, and each of said wells extends downwardly a predetermined depth from the upper surface of said keyboard housing and is of a generally four sided shape, with said first key switch means comprising a first key in the bottom of each of said wells and second, third, fourth, and fifth keys on the four sides, respectively, of each well surrounding the bottom thereof, so that selected switches corresponding to each key in each of said wells are operated by a finger pressing downwardly to operate the key in the bottom of the well and pressing forward, backward, left and right to selectively operate each of the respective other ones of said second, third, fourth and fifth keys.

15. The combination according to claim 14 further including a mode shift key switch means operated by at least one of the thumbs to change the operating mode of said keyboard, such that in one operating mode of said keyboard, the four key switch means which are grouped about each of at least two fingers become cursor control keys corresponding to upward, downward, left and right cursor keys; and one finger causes cursor movement to be effectuated relatively more rapidly, and the other finger causes cursor control to be effectuated relatively more slowly.

16. The combination according to claim 15 wherein each two adjacent cursor control keys are capable of simultaneous activation by one fingertip simultaneously depressing both adjacent keys to produce a diagonal cursor control signal composed of directional movement which is the mathematical sum of the two activated cursor control keys.

17. The combination according to claim 14 wherein said predetermined pattern of keys at said thumb position comprises at least first and second thumb keys on one of the upright sides of the thumb receiving cavity.

18. The combination according to claim 17 wherein each of said thumb receiving cavities has three upright sides, with two keys located side-by-side thereon for engagement by a thumb, and the bottom of each of said thumb receiving cavities has a bottom key therein.

19. The combination according to claim 13 wherein said thumb position is located on one side of said raised central portion of each of said housings to permit such raised central portion to be grasped by the thumb of an operator placed in said thumb position.

20. A keyboard for controlling data input including in combination:

physically separate keyboard sections for the left and right hands each having support surfaces for underlying and fitting against the palm of a hand;

individual fingertip wells and thumb wells located adjacent said support surfaces at the positions of relaxed hands placed with the palms resting on said support surfaces, each of said fingertip wells freely receiving the fingertips of an operator and each of said wells having an open-top with substantially front, back, left and right vertical walls and a bottom, with the palms of the hands remaining in one basic position resting on said support surfaces throughout the operation of said keyboard sections;

key switch means arranged three dimensionally about the fingers and thumbs in said wells in the bottom and on the walls thereof, the pattern of placement of said key switch means within said wells being such that downward finger movements actuate first key switch means at the bottom of said fingertip wells which represent the same key characters normally operated by such fingers in the "home" position of a standard QWERTY keyboard;

second key switch means located on the front vertical walls of said fingertip wells so that forward motion of each fingertip directed away from the operator causes the fingertip to freely travel forward and impact the second key switch means such that said second key switch means thereby actuated represent the same key characters the same corresponding fingers normally actuated on a standard QWERTY keyboard when the actuating fingers move to the key directly above the "home" row of keys on a standard QWERTY keyboard;

third key switch means located on the back vertical walls of said fingertip wells such that contracting motions of each fingertip directed toward the operator allow the fingertips to freely travel to impact and actuate said third key switch means, such that said third key switch means thereby actuated represent the same key characters the same corresponding fingers normally actuated on a standard QWERTY keyboard for the keys directly below the "home" row of keys;

a fourth key switch means located on the left vertical wall of said fingertip well corresponding to the right index finger, where actuation of the right index fingertip to the left within said well operates said fourth key switch means to represent the character "H"; and a fifth key switch means on the right vertical wall of said fingertip well corresponding to the left index finger such that movement of the left index fingertip to the right within the well causes actuation of said fifth key switch means to represent the character "G".

21. The combination according to claim 20, further including a mode shift key switch means operated by one of the thumbs and fingers to change the operating mode of said keyboard, such that numerical characters normally present on the top row of a standard QWERTY keyboard are now represented by said first key switch means in the bottoms of each of the fingertip wells which, prior to operation of said mode shift key means, corresponded to alphabetic characters of the home row of keys of a standard QWERTY keyboard.

22. The combination according to claim 20, further including a mode shift key switch means operated by one of the thumbs and fingers to change the operating mode of said keyboard, such that the characters present on the top row of a standard QWERTY keyboard are now represented by said first key switch means in the bottoms of each of the fingertip wells which correspond to the home row of keys of a standard QWERTY keyboard with the result that the characters present on a standard QWERTY keyboard at the fourth row of character keys, namely the numbers, sequentially from left to right: 1, 2, 3, 4, 5, 6, 7, 8, 9, and 0, are now actuated by the same key switch means that, when the mode shift key switch is not operated, are used to actuate the characters present on a standard QWERTY keyboard at the middle home row of keys, which are from left to right: A, S, D, F, G, H, J, K, L, and ;, while in such mode shift state the characters present as uppercase shifted QWERTY fourth row character keys, which are from left to right: !, @, #, $, %, ©, &, *, (, ), and , are operated by the same finger in the same finger well that operates the corresponding number key switch means.

* * * * *